(12) United States Patent
Garside

(10) Patent No.: US 8,424,504 B2
(45) Date of Patent: Apr. 23, 2013

(54) ROTARY PISTON INTERNAL COMBUSTION ENGINE

(76) Inventor: David W. Garside, Birmingham (GB)

( * ) Notice: Subject to any disclaimer, the term of this patent is extended or adjusted under 35 U.S.C. 154(b) by 441 days.

(21) Appl. No.: 12/866,416

(22) PCT Filed: Feb. 5, 2009

(86) PCT No.: PCT/GB2009/000319
§ 371 (c)(1),
(2), (4) Date: Aug. 5, 2010

(87) PCT Pub. No.: WO2009/101385
PCT Pub. Date: Aug. 20, 2009

(65) Prior Publication Data
US 2010/0313844 A1    Dec. 16, 2010

(30) Foreign Application Priority Data

Feb. 13, 2008    (GB) .................................. 0802603.1

(51) Int. Cl.
*F02B 53/00*    (2006.01)
*F02B 3/04*    (2006.01)
*F02B 25/06*    (2006.01)
*F01C 1/02*    (2006.01)
*F01C 21/04*    (2006.01)

(52) U.S. Cl.
USPC ........... 123/200; 418/61.2; 418/86; 123/45 A; 123/573

(58) Field of Classification Search .................. 123/213, 123/45 R, 572–573, 200; 418/96, 84, 100, 418/61.2
See application file for complete search history.

(56) References Cited

U.S. PATENT DOCUMENTS 3,764,234 A * 10/1973 Morgan et al. .................. 418/84
3,858,557 A    1/1975 Myers et al.
(Continued)

FOREIGN PATENT DOCUMENTS

EP    0273653    7/1988
GB    0969591    9/1964
(Continued)

OTHER PUBLICATIONS

David Biloen, International Search Report in PCT/GB20091000319, Jun. 23, 2009, 3 pages, European Patent Office, Rijswijk, Netherlands.

(Continued)

*Primary Examiner* — Kenneth Bomberg
*Assistant Examiner* — Deming Wan
(74) *Attorney, Agent, or Firm* — Florek & Endres PLLC

(57) ABSTRACT

A rotary piston internal combustion engine of the Wankel type has a housing (1) with a two lobed epitrochoidal inner peripheral surface (14) a shaft (8) journalled in end casings (3, 4), a rotor (9) eccentrically mounted on the shaft (8) and geared to rotate at one third speed of the shaft (8) whereby working chambers (34, 35, 36) are formed between flanks of the rotor (9) and the end casings (3, 4), which chambers vary in volume as the rotor (9) rotates, the rotor (9) being cooled by a cooling medium in a generally closed cooling circuit, the medium being circulated by a circulating pump (27), via connecting passageways (20, 18) in the end casings (3, 4) and an internal passageway (21) of the rotor (9), and through an external cooling heat exchanger (24), the cooling medium being blow-by gasses from the high pressure working chambers, which gasses have leaked past the rotor side seals (26) into the rotor cooling passages.

12 Claims, 2 Drawing Sheets

U.S. PATENT DOCUMENTS

| | | | | |
|---|---|---|---|---|
| 3,964,445 | A * | 6/1976 | Ernest et al. | 418/83 |
| 3,967,593 | A * | 7/1976 | Garside | 123/220 |
| 3,970,050 | A * | 7/1976 | Hoadley | 123/213 |
| 3,993,029 | A * | 11/1976 | Eiermann et al. | 123/203 |
| 4,486,159 | A * | 12/1984 | Garside | 418/61.2 |
| 4,793,304 | A * | 12/1988 | Eiermann | 123/205 |
| 5,121,721 | A * | 6/1992 | Bando | 123/242 |
| 6,325,603 | B1 * | 12/2001 | Moller | 418/86 |

FOREIGN PATENT DOCUMENTS

| | | |
|---|---|---|
| GB | 1068209 | 5/1967 |
| GB | 1385687 | 2/1975 |
| GB | 1386811 | 3/1975 |
| GB | 2199082 | 12/1987 |
| WO | 2007/017867 | 2/2007 |
| WO | 2009/115768 | 9/2009 |

OTHER PUBLICATIONS

Kai Tietje, International Search Report in PCT/GB2009/000610, Jun. 3, 2009, 2 pages, European Patent Office, Rijswijk, Netherlands.

Peter Mason, U.K. Search Report in GB0802603.1, Jun. 17, 2008, 1 page, U.K. Intellectual Property Office.

D. Eiermann et al., "The Introduction of a New Ultra-Lite Multipurpose Wankel Engine", SAE Technical Paper Series (900035), International Congress and Exposition, Detroit, Michigan, Feb. 26, 1990-Mar. 2, 1990, 12 pages, (XP007908780).

* cited by examiner

ROTARY PISTON INTERNAL COMBUSTION ENGINE

This application is a U.S. National Stage filing under 35 U.S.C. §371 International Application No. PCT/GB2009/000319, filed Feb. 5, 2009, which in turn claims priority to British Patent Application No. 0802603.1, filed Feb. 5, 2008.

BACKGROUND OF THE INVENTION

The present invention relates to rotary piston internal combustion engines.

More particularly, but not exclusively, the invention relates to a so called Wankel engine in which a rotary piston, or so called rotor, rotates within a cavity formed by a rotor housing, the rotor outer periphery and the inner peripheral surface of the cavity being so shaped that working chambers are formed between the rotor and the inner peripheral surface which vary in volume as the rotor rotates, the cavity being provided with inlet and exhaust ports. In the best known example of an engine of the kind referred to, the cavity includes a stationary rotor housing having a two lobed epitrochoidal shaped cavity and a rotor of substantially triangular shape but with convex arcuate flanks, seals or so called apex seals at the apices of the rotor maintaining sealing contact with the inner peripheral surface of the cavity of the rotor housing, and seals or so called side seals, at the sides of the rotor maintaining sealing contact with two axially spaced end casings, and the rotor rotating in a planetary manner within the cavity.

One known method of cooling the rotor of an engine of the kind referred to is to circulate oil though internal passages in the rotor. Disadvantages of this system include considerable design complexity to seal the oil within the rotating and orbiting rotor, the space required for the oil seals prohibiting use of engine geometry of the more compact kind; and some power and thermal efficiency is lost through friction of the oil seals combined with the so called cocktail-shaker losses of the oil inside the rotor.

A known alternative method of cooling the rotor is to use air as the coolant. This has advantages of simple construction, more compact engine geometry, and low mechanical friction losses.

In one version, one or more passageways are formed in the rotor which form part of the induction passage to the working chambers of the engine such that air plus fuel is drawn through and thereby cools the rotor. A disadvantage of this system is that the air/fuel mixture becomes heated during its passage through the rotor and hence the volumetric efficiency and the power output of the engine is impaired.

Partially to overcome this disadvantage, alternative systems are known where only the induction air is drawn through the rotor, the air then passing through a plenum chamber and/or an intercooler before the fuel is added and the mixture then inducted into the working chamber. Nevertheless, the power is lower than in oil cooled rotor types of engine because of the pressure loss associated with the complex induction system, and the inability to cool the air down to ambient levels with a practical size of intercooler.

Rotary piston engines of this type are set forth in Pat. Nos. GB 1385687 and GB 1386811.

A further known type of rotary piston engine with air cooled rotor uses means to force ambient air through the rotor and then eject it direct to atmosphere and not be inducted by the engine, the air that is inducted to the working chamber being a separate supply of air at ambient pressure and temperature. Alternative known means of forcing the air through the rotor passages include use of an engine-driven centrifugal fan, or use of an exhaust ejector, or use of ram air only, such ram air resulting from the velocity of the machine or vehicle in which the engine is mounted through the atmosphere.

A rotary piston engine of this type is set forth in Pat. No. EP 0273653.

By these means these types of engines will give a higher power output than the oil cooled rotor types of engine as a result of the higher mechanical efficiency of the air cooled rotor type combined with the same level of volumetric efficiency as the oil cooled rotor type.

A disadvantage of the type of engine that ejects the spent rotor cooling air to atmosphere is that the oil which lubricates the bearings and rubbing surfaces inside the rotor is used for only one pass through the rotor and is then inevitably ejected with the cooling air. In some applications of the engine, such as the powering of unmanned air vehicles, this emission of wet oil particles may be acceptable, but in most ground and marine application, this is unacceptable. Another disadvantage is that the oil consumption is relatively high because separate oil supplies have to be provided for both the rotor internals and the inner epitrochoidal peripheral surface upon which the apex seals are sliding.

To counteract these problems, in another type of rotary piston engine, ejected rotor cooling air plus oil is passed through an oil separator before ejection and so a proportion of oil is captured and available for re-use. It is difficult though to make the oil separator 100% efficient in collecting the oil without a pressure loss to the cooling air passing through the oil separator being high, thereby requiring the engine-driven rotor cooling fan to require a high power input. For this reason it is not practical to combine the use of an efficient oil separator with the ram air or the exhaust ejector systems of forcing the air through the rotor.

In all rotary engines with air cooled rotors described above, the cooling of the rotor is such that the systems require careful design to avoid the rotor overheating in adverse conditions of operation.

There exist potential applications of these engines where known methods of cooling of the rotor by air are not suitable and the oil cooled rotor system has to be employed. For example, the use of a rotary piston engine with an air cooled rotor would not be appropriate with turbocharging or other means of forced induction when the heat input to the rotor is considerably increased relative to a naturally aspirated engine. This situation is particularly true for the important application of turbocharging of engines fitted to aircraft which are required to fly with good performance at higher altitudes. The purpose and effect of turbocharging is to maintain high power in a less dense atmosphere which results in continuing high level of heat input to the rotor which coincides with a reduced ability of the less dense air to cool the rotor.

SUMMARY OF THE INVENTION

According to the invention we provide a rotary piston internal combustion engine including a housing having a two lobed epitrochoidal inner peripheral surface, end casings for the housing, an output shaft journalled in the end casings, a three flanked rotary piston within the housing mounted on the shaft eccentrically with respect thereto and geared to rotate at one third speed of the output shaft whereby working chambers are formed between the rotor flanks and the inner surface of the housing, the rotor having side seals which engage with inner side faces of the end casings, a cooling circuit around which a cooling medium is circulated for cooling the rotor, the cooling circuit including at least one internal passageway provided in the rotor and a passageway in each end casing, the internal passageway of the rotor and the passageways of the end casings aligning as the rotor rotates, and the cooling circuit further including a cooling heat exchanger, a circulating pump and connecting ducting, the cooling medium being provided by blow-by gasses which have leaked from the working chambers past at least one of the side seals of the rotor to the cooling circuit.

It should be understood that the side seals which are fitted at the sides of the rotor are intended to prevent any gas leakage from taking place between the working chambers of the engine and the inside of the rotor. In practice, the sealing efficiency is not 100% and some blow-by of gas takes place.

Three advantages may be achieved with the present invention.

The first is the provision of an engine in which no wet oil particles are ejected from the cooling circuit, the second is the provision of a rotor cooling system with improved cooling capacity such that the engine is suitable for all types of usage including being fitted with a turbocharger; and a third is the provision of improved lubrication of the rotor internals whilst achieving a lower level of oil usage.

The advantages of the invention may further be realised by the inclusion of any of the features set out in claims 2 to 11 appended hereto.

BRIEF DESCRIPTION OF THE DRAWINGS

Embodiments of the present invention will now be described with reference to the accompanying drawings in which:-

DETAILED DESCRIPTION OF THE PREFERRED EMBODIMENTS

Figure 1:
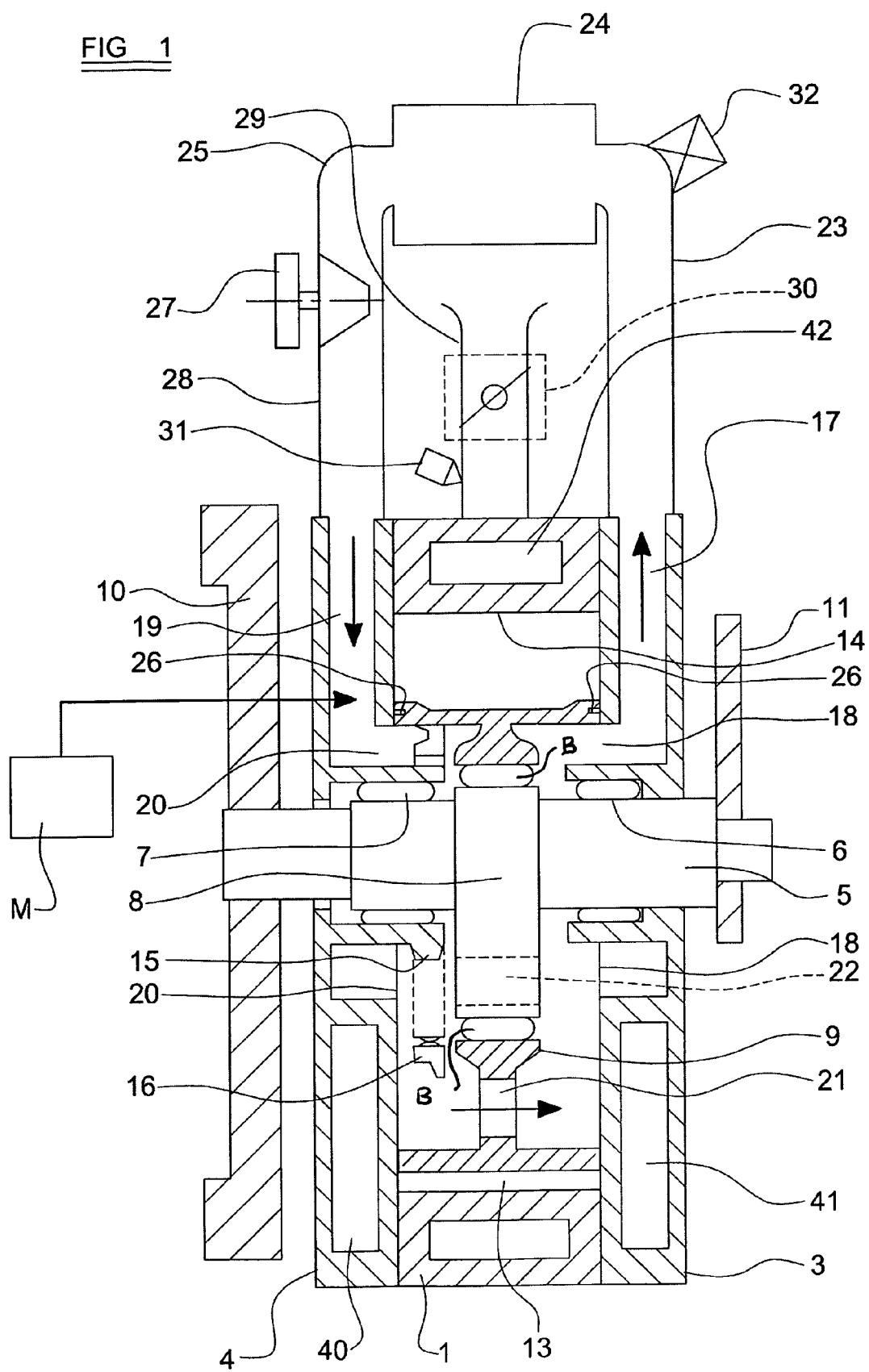
FIG. 1 is a schematic cross section through a rotary piston engine according to the invention.

Referring to the drawings, an engine includes a rotor housing 1 having a cavity with a two lobed epitrochoidal inner peripheral surface or bore 14 and end casings 3 and 4. An engine output shaft 5 is rotatably journalled via rolling element or other bearings 6 and 7 in the end casings 3 and 4 respectively, and the shaft 5 has an eccentric journal 8 on which is rotatably mounted, a rotor 9. A flywheel 10 and a balance weight 11 are mounted on opposite ends of the shaft 5.

The rotor 9 has an apex seal being a sealing strip 13, disposed at each of its three apices, each sealing strip 13 maintaining sealing contact between its respective apex of the rotor 9 and the inner peripheral surface 14 as the rotor 9 rotates, in planetary manner, within the cavity 14. The rotor 9 rotates at a speed of one third that of the output shaft 5 and is controlled by an externally toothed stationary gear 15 meshing with an internally toothed gear 16 which is mounted in the rotor 9.

One end casing 4, has an inlet passage 19 which has one or more openings 20 disposed to either side of the stationary gear 15, the openings 20 being so shaped as to be contained within an inner envelope of rotation of side seals 26 described below, on the rotor 9 which side seals 26 effect a seal between sides of the rotor 9 and the end casings 3 and 4. The end casing 4 with the inlet passage 19 is an upstream casing 4 in terms of cooling medium flow.

The other end casing 3 is similarly provided with openings 18 and an outlet passage 17.

Cooling medium can flow through inlet passage 19 in upstream end casing 4 and thence via the or each opening 20 in the end casing 4, to one or more openings 18 in the other downstream, end casing 3, through the interior of the rotor 9, there being one or more passageways in e.g. a web of the rotor 9 to allow airflow therethrough.

Additionally one or more passageways 22 may be formed in the eccentric journal 8 to allow a parallel airflow therethrough and thereby cooling of the output shaft 5.

A duct 23 connects the passage 17 in the downstream end casing 3 to a cooling heat exchanger 24. A further duct 25 connects the exit of the cooling heat exchanger 24 to a cooling medium circulating pump 27, and a yet further duct 28 connects the exit from the pump 27 to the passage 19 in the upstream end casing 4. In another example, the pump 27 could be at the upstream side of the heat exchanger 24, as required.

A cooling circuit for cooling medium is thus established by the respective passageways 19, 17 in the upstream and downstream end casings 4, 3, the passageway or passageways 21 through the rotor 5 when the passageway or one of the passageways 21 through the rotor 5 is aligned with the or one of the openings 20 in the upstream end casing 4 and the or one or more of the openings 18 in the downstream end casings 3, and via the duct 23, to the heat exchanger 24, duct 25 to the pump 27 and duct 18 back to the inlet passage 19 in the upstream end casing 4.

A pressure relief valve 32 is provided in the cooling circuit in duct 23 to the heat exchanger 24 but may be located in another part of the cooling circuit.

An induction air pipe 29, and a carburettor 30 or an alternative fuel injection nozzle 31 are shown, either or both of which may be provided to supply an induction chamber of the engine with air and fuel for combustion.

Alternatively, the engine may be supplied with fuel by means of a direct injection system into working chambers of the engine (not shown).

The rotor 9 cooling circuit described would be provided additionally to a main cooling system for the rotor housing 1 (including the end casings 3, 4). One or more cooling passages 42 may be provided in the rotor housing 1 and further cooling passageways 40 and 41 may be provided in the end casings 3, 4. These passageways 40-42 may contain liquid coolant for a conventional cooling system (not shown).

Alternatively, the rotor housing 1 and end casings 3, 4 may be fitted with external cooling fins and be air cooled to provide a main cooling system.

The cooling medium for the rotor cooling circuit is provided by blow-by gasses, passing from working chambers of the engine, into the cooling circuit at pressure.

Figure 2:
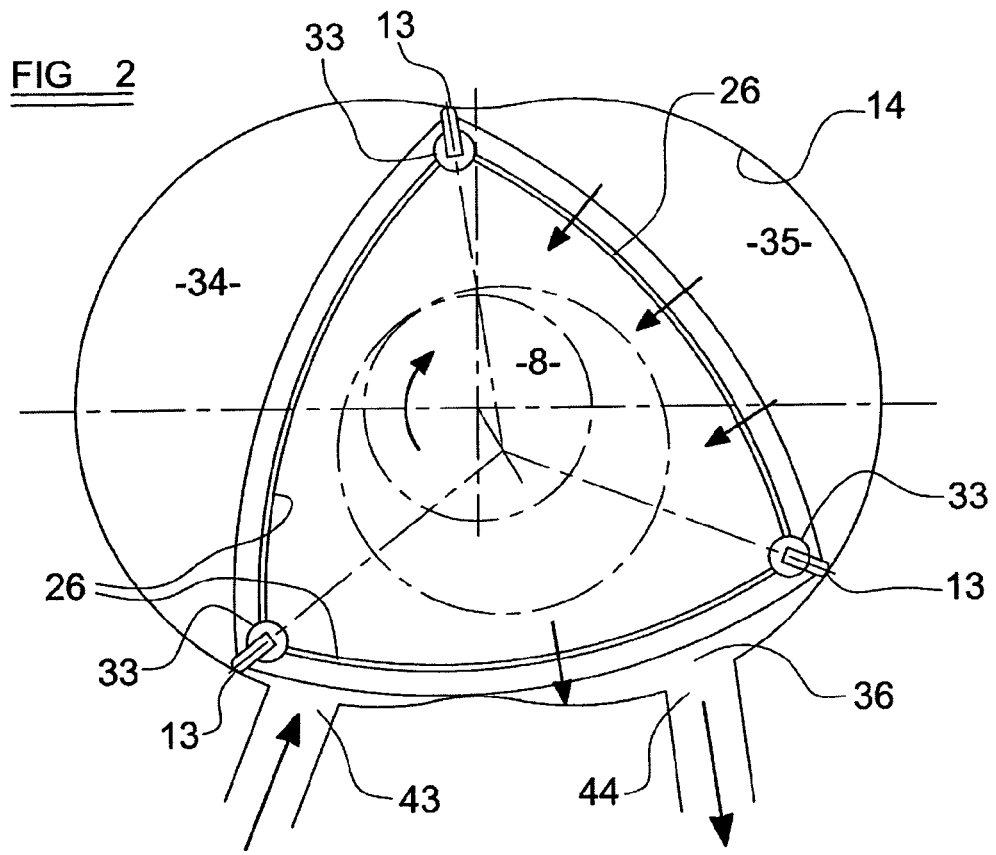
FIG. 2 is a diagrammatic side view of the rotor.

FIG. 2 illustrates a gas leakage path across side seals 26 between working chambers 34-36 of the engine and the cooling circuit for the pressurised blow-by gasses. Apex seals 13 at each rotor apex slideably engage with the inner peripheral epitrochoidal surface 14. The side seals 26 make sealing engagement with the apex seals 13 via so called corner bolts 33.

A side seal 26 (at each side of the rotor 9) extends, in this example, alongside a rotor flank, between each of two successive apex seals 13 or corner bolts 33, around the rotor 9, so that in the example, each of the three rotor flanks has a side seal 26, which side seals 26 then create the inner envelope of rotor rotation at each side of the rotor 9.

An inlet port 43 and an exhaust port 44 are shown.

One working chamber, 34, is shown at the beginning of the compression stroke and the pressure in the chamber 34 at this instant will be a similar value to the pressure of the cooling medium in the cooling circuit, at least in the passageway or passageways 21 inside the rotor 9. Thus little or no leakage of gasses across the side seals 26 will take place. Another working chamber, 35, is shown part way through the expansion stroke, and here the pressure in the chamber 35 is high and there will be some gas leakage past the side seals 26 from the working chamber 35 to the cooling circuit, i.e. to the passageway or passageways 21 inside the rotor 9.

Another working chamber 36 is shown just completing the exhaust stroke. The chamber 36 pressure will be relatively low and there may be some reverse gas leakage from the pressurised cooling circuit past the respective side seals 26, to the exhausting working chamber 36.

Figure 3:
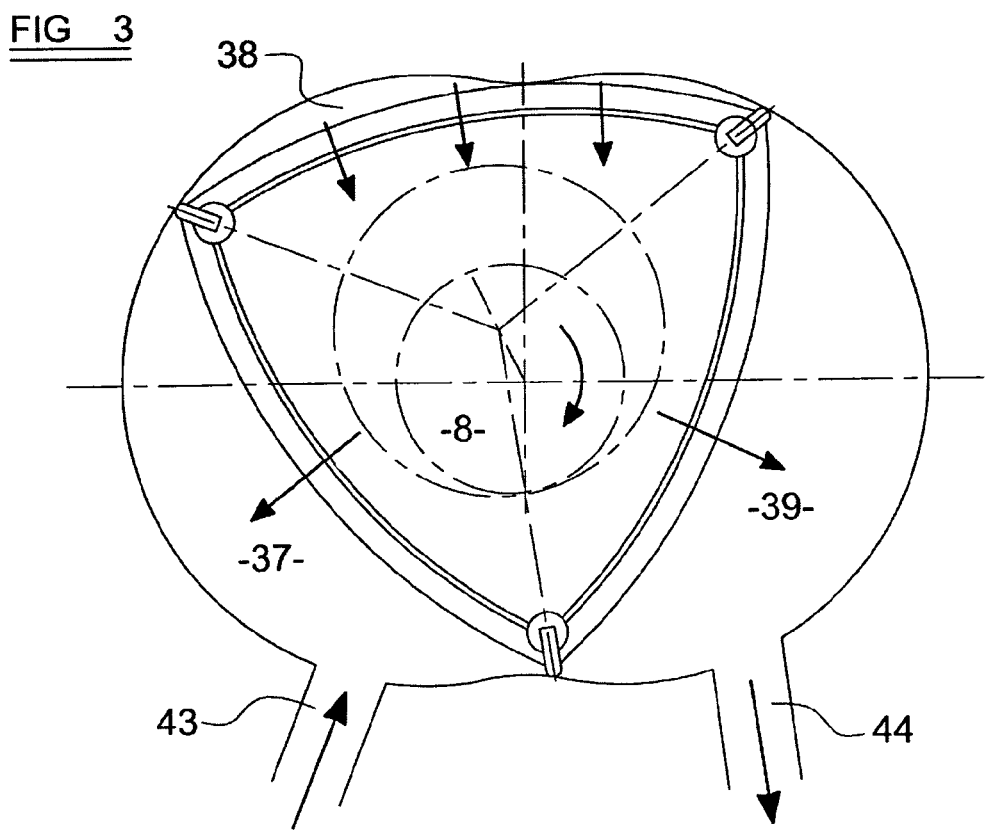
FIG. 3 is a view similar to FIG. 2 but showing an engine output shaft having rotated through 180 degrees.

In FIG. 3 a working chamber 37 is shown part way through the induction stroke. Here again the working chamber 37 pressure will be low and there may be some gas leakage past the respective side seals 26 from the cooling circuit to the working chamber 37. Yet another working chamber 38 is shown close to the end of the compression stroke. Here the working chamber 38 pressure is high and there will be leakage of air-fuel mixture from the working chamber 38 past the side seals, to the cooling circuit and thus to the passageway or passageways 21 of the rotor 9. Yet still another working chamber 39 is shown which is part way through the exhaust stroke, similar to that of working chamber 36 shown in FIG. 2.

The cooling heat exchanger 24 may be of any suitable type which produces cooling of the cooling medium in the cooling circuit. The cooling capacity of the heat exchanger 24 does not have to be high because the quantity of heat rejected to the rotor 9 in the kind of engine described is equivalent to only about 10% of the output shaft 5 power output. Typically the heat exchanger 24 is an air-to-air type where ambient air is the coolant. However, in an engine used in a marine environment, e.g. to power a boat, the coolant may more preferably be water.

The cooling circuit pump 27 may be of any suitable type but may be a centrifugal fan type mechanically driven from the output shaft 5 of the engine or by an electric motor or by a turbine powered by the exhaust gases of the engine, as required.

If it so happened that side seals for this type of engine were developed such that the sealing quality between the rotor 9 sides and the end casings 3, 4 was so high that insufficient gas leaked past these seals satisfactorily to pressurise the cooling medium in the rotor cooling circuit to the desired level, then a path, e.g. via a small depression, could be formed in either or both end casings 3, 4, such a depression being traversed by the side seals 26 shortly before the exhaust port 44 opens thereby intentionally allowing leakage or additional leakage of blow-by gasses from the high pressure working expansion chamber to take place and the desired pressurization thereby being achieved.

Whilst the invention described with reference to FIG. 1 shows a single rotor 9 engine, it will be apparent that it is equally applicable to engines of the kind referred to having two or more rotors the gas cooling flows for the multiple rotors being arranged to be in parallel rather than in series.

The volume of blow-by gas which leaks past side seals 26 will vary with engine speed and load but it is known that it may amount to around 1% to 2% of the induction airflow volume for this type of engine.

The present invention utilises this blow-by of gas to advantage. Before the engine is first started the closed-circuit cooling circuit for the rotor 9 will enclose air at ambient pressure. When the engine operates, some blow-by air-fuel mixture from the compression working chamber, e.g. chamber 38 in FIG. 3, and some blow-by combustion gas from the expansion working chamber, e.g. chamber 35 in FIG. 2, will leak past the respective side seals 26 of the rotor 9 and enter the closed cooling circuit so the pressure in that circuit will rise. The gas which enters the cooling circuit will be a mixture of air and fuel, carbon dioxide and other partially combusted gases.

The greater proportion of the mixture of gases which enters the closed cooling circuit may be spent combustion gases because it can be expected that there will be a greater volume of blow-by gas from the high pressure expansion working chamber 35 than there will be from the lower pressure compression working chamber 38. This gas leakage will rapidly pressurise the cooling circuit to a value significantly above the outside ambient pressure and, if desired, to a pressure of several bar above the ambient pressure when the engine is operated at high load. The maximum pressure reached will normally be controlled by the pressure relief valve 32, the relief pressure valve 32 being selected and/or adjusted to give the level of pressurisation required. The location and design of the pressure relief valve 32 should preferably ensure that no oil is lost through this valve.

Any gas released from the pressure relief valve 32 may be ducted to the engine induction system 29 as is normal for the blow-by gas which is also emitted in reciprocating piston type engines.

With the cooling circuit described (preferably totally sealed other than the internal leakages which pass the side seals 26 from and to the working chambers 35, 38 etc. of the engine, together with any gas vented from the pressure relief valve 32) no wet oil particles are emitted to atmosphere. It will also be understood that the higher pressure and resulting higher density gas which is passing through the internal rotor cooling passageway or passageways has greater potential for removing heat than previously known arrangements employing ambient pressure air. The pressure value of the gas in the cooling circuit may be chosen to be up to several bar higher than the ambient pressure depending on the application of the engine. For example, an engine fitted with a turbocharger may utilise a higher level of cooling circuit pressurisation, whilst a non-turbocharged engine with a light duty cycle may utilise a lower level of cooling circuit pressurisation.

Lubricating oil may be supplied to the cooling circuit from a metering pump M through the upstream end casing 4, to a point close to the entry of the cooling medium in the cooling circuit to the passageway or passageways 21 in the rotor 9. The oil will be carried by the circulating cooling gas to lubricate internal rubbing surfaces of the rotor 9 and gears 15, 16 and bearings 6, 7 and rotor bearings indicated at B in FIG. 1. The greater proportion of the oil will then pass out of the rotor 9, through the external ducting 23, through the cooling heat exchanger 24, and pump 27 and then be returned to the passageways 21 of the rotor 9 to recommence a further circuit. After the first starting of the engine there will be a gradual increasing quantity of oil passing through the rotor 9 and this rate may be higher than the rate being supplied from the oil metering pump M.

A stable quantity of oil which is circulating through the cooling circuit will be achieved when the quantity of oil escaping outwards and passing the rotor side seals 26 into the working chambers is equal to the quantity supplied from the oil metering pump M, there being no other route for oil to leave the rotor cooling circuit.

Oil which passes from the cooling circuit past the side seals 26 into the working chambers will move outwards of the end casing 3, 4 inner side faces and thereby on to the inner peripheral epitrochoidal surface 14 of the cavity of the rotor housing 1, thereby lubricating the apex seals 13 before the oil finally passes out of the exhaust port 44 with hot exhaust gasses and generally being burned or vaporised.

This system of enabling the same oil to pass through the rotor 9 several times instead of just once with the known systems will result in a higher standard of engine lubrication; and will permit the flow setting of the oil metering pump M to be reduced to a minimum such that the oil consumption is lower than in previous comparable engines which do not embody the invention.

If desired, for example if the engine was inverted compared to the orientation indicated in FIG. 1, lubricating oil could gather at the lowest point of the cooling circuit e.g. in the heat exchanger 24. Thus a well may be constituted for such gathered oil. If desired there may be a path for such oil from back to the oil tank from where the oil pump M draws oil, for example, under the influence of the pressure in the cooling circuit.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A rotary piston internal combustion engine including a housing having a two lobed epitrochoidal inner peripheral surface, end casings for the housing, an output shaft journalled in the end casings, a three flanked rotary piston within the housing mounted on the shaft eccentrically with respect thereto and geared to rotate at one third speed of the output shaft whereby working chambers are formed between the rotor flanks and the inner surface of the housing, the rotor having side seals which engage with inner side faces of the end casings, a cooling circuit around which a cooling medium is circulated for cooling the rotor, the cooling circuit including at least one internal passageway provided in the rotor and a passageway in each end casing, the internal passageway of the rotor and the passageways of the end casings aligning as the rotor rotates, and the cooling circuit further including a cooling heat exchanger, a circulating pump and connecting ducting, the cooling medium being provided by blow-by gasses which have leaked from the working chambers past at least one of the side seals of the rotor to the cooling circuit.

2. An engine as in claim 1 wherein the cooling circuit is generally closed and the blow-by gasses in the rotor internal passages operate at pressures higher than the external ambient air pressure.

3. An engine as in claim 1 wherein the cooling circuit includes a pressure relief valve to control the maximum pressure of the blow-by gasses in the cooling circuit.

4. An engine as in claim 1 further comprising an oil-metering pump supplying lubricating oil into the blow-by gasses to provide lubrication.

5. An engine as in claim 4 further comprising journal bearing wherein the shaft is supported by the journal bearings in the end casings, one of the bearings being an upstream bearing adjacent a position where the cooling medium passes from the passageway in the end casing, into the internal passageway of the rotor, and the initial entry of the lubricating oil into the cooling circuit is via the journal bearing in the upstream end casing.

6. An engine as in claim 1 wherein the circulating pump of the cooling circuit is driven from the engine output shaft.

7. An engine as in claim 1 wherein the rotor includes first, second and third apex seals each of which engages the epitrochoidal inner peripheral surface as the rotor rotates, and one side seal extending from at or adjacent the first apex seal to at or adjacent the second apex seal, a second side seal extending from at or adjacent the second apex seal to at or adjacent the third apex seal, and the third side seal extending from at or adjacent the third apex seal to at our adjacent the first apex seal.

8. An engine according to claim 7 wherein at least one of the end casings affords a leakage path for blow-by gasses to leak from a working chamber past the side seal into the cooling circuit.

9. An engine according to claim 1 wherein the cooling heat exchanger is cooled by ambient air.

10. An engine according to claim 1 wherein the cooling heat exchanger is cooled by water.

11. An engine according to claim 8 where in the leakage path is defined by a recess in at least one end casing.

12. An engine according to claim 9 where in the ambient air is ram air.

* * * * *